US012649339B2

(12) United States Patent
Singh et al.

(10) Patent No.: US 12,649,339 B2
(45) Date of Patent: *\*Jun. 9, 2026**

(54) HITCH VIBRATION DAMPENER

(71) Applicant: Advanced Engineering Group, LLC, Valencia, CA (US)

(72) Inventors: Arvinder Singh, Valencia, CA (US); Hardeep Singh, Valencia, CA (US); Jeff Good, Cayucos, CA (US)

(73) Assignee: Advanced Engineering Group, LLC

( * ) Notice: Subject to any disclaimer, the term of this patent is extended or adjusted under 35 U.S.C. 154(b) by 475 days.

This patent is subject to a terminal disclaimer.

(21) Appl. No.: 18/202,949

(22) Filed: May 28, 2023

(65) Prior Publication Data

US 2024/0391281 A1     Nov. 28, 2024

Related U.S. Application Data

(63) Continuation-in-part of application No. 17/223,889, filed on Apr. 6, 2021, now Pat. No. 11,660,916, which is a continuation-in-part of application No. 16/518,471, filed on Jul. 22, 2019, now Pat. No. 11,628,698.

(60) Provisional application No. 62/711,771, filed on Jul. 30, 2018.

(51) Int. Cl.
B60D 1/06 (2006.01)
B60D 1/07 (2006.01)
B60D 1/24 (2006.01)
B60D 1/32 (2006.01)

(52) U.S. Cl.
CPC ................. B60D 1/06 (2013.01); B60D 1/07 (2013.01); B60D 1/241 (2013.01); B60D 1/249 (2013.01); B60D 1/325 (2013.01)

(58) Field of Classification Search
CPC ... B60D 1/06; B60D 1/07; B60D 1/46; B60D 1/241; B60D 1/249; B60D 1/325
USPC ........................................ 280/511
See application file for complete search history.

(56) References Cited

U.S. PATENT DOCUMENTS 5,839,744 A * 11/1998 Marks .................. B62D 53/021
                                                  280/511
11,325,434 B2 * 5/2022 Pennington .............. B60D 1/46

* cited by examiner

*Primary Examiner* — Alentin Neacsu
*Assistant Examiner* — Felicia L. Brittman-Alabi
(74) *Attorney, Agent, or Firm* — Apex Juris, pllc; R. Lynette Wylie

(57) ABSTRACT

A height adjustable tow mount assembly wherein locked engagement of corresponding through holes disposed in a tow mount member and an elongate member compresses a dampener member between an abutting front surface of the hitch platform elongate member and a rear surface of the tow mount member to thereby reduce movement and associated vibration between the hitch platform and tow mount member.

23 Claims, 8 Drawing Sheets

HITCH VIBRATION DAMPENER

CROSS-REFERENCE TO RELATED APPLICATIONS

This application claims priority to and benefit under 35 USC § 119 (e) of U.S. patent application Ser. No. 17/223, 889 having a filing date of Apr. 6, 2021, of U.S. patent application Ser. No. 16/518,471 having a filing date of Jul. 22, 2019 issued as U.S. Pat. No. 11,628,698, which claims priority to and benefit under U.S. Provisional Patent Application Ser. No. 62/711,771 having a filing date of Jul. 30, 2018, which are both hereby incorporated by reference herein.

FIELD OF THE INVENTION

This invention relates to the field of tow accessories having hitch ball receivers, particularly relating to a multiple hitch assembly having a dampening mechanism for reducing the relative movement and rattling between a tow accessory base and hitch receiver.

BACKGROUND OF THE INVENTION

Many vehicles today are equipped with receiver-type trailer hitches. These types of trailer hitches typically are a square tube, normally 1¼" or 2" internal height and width, attached to the undercarriage of the vehicle. A second tube acts as a shank and includes outer dimensions slightly smaller than the internal dimensions of the receiver tube and is slidable within the receiver tube. The shank member is connected to the receiver tube by a secured pin inserted through the two tubes.

The shank member may include a standard single or dual ball-mount for engaging with the hitch of a trailer or other wheeled vehicle. Another popular use for receiver hitches is the use as a coupling device for installing equipment racks, ski carriers, storage boxes and other types of carriers having a second tube dimensioned to engage within a receiver hitch tube. This provides a universal system that allows a vehicle user to be able to use various trailer and carriers with a single coupling system.

A particular problem with the use of these receiver coupling systems is play between the receiver hitch platforms and hitch ball or direct tow accessory assemblies. The base of the tow mount or accessory tends to rattle or chatter within the channel of the hitch platform. This rattle or chatter is at best an annoyance and at worst can distract the driver or cause damage to the trailer or the carrier.

There have been a number of attempts to solve this problem in the past. Such attempts typically required the use of specially designed receivers, shanks, or mechanisms that typically adapt size and fasteners to stabilize junctures between hitch assemblies.

One such prior art hitch assembly addressing the latter problems is shown in the prior art height adjustable dual hitch ball flange platform assembly shown, described and claimed in U.S. Pat. No. 8,033,563. The latter patented hitch assembly employs two locking pins on an upper and lower section of the dual hitch ball base inserted through corresponding holes in the double flanges to secure and stabilize the hitch ball base at an appropriate height within a vertical channel formed between two outwardly extending flanges.

Although the latter dual pin mount provided the substantial improvements of reduced play, rattling and pivoting of the hitch assembly relative to the vehicle, movement and vibration due to loosening and play between the tow accessory member and hitch receiver platform persists. The movement and noise is exacerbated if the tow accessory is installed on an upper or lower section of the channel and thus not evenly supported along the base of the tow accessory. Such eccentric positioning of the hitch ball along the hitch platform channel and resulting movement causes vibrations and gyrating movement. In extreme driving terrain or weather conditions, even hazardous swaying of the vehicle may result.

Prior art devices further include inserting a rubber device into apertures of a universal tow platform, which preferably fills three apertures adjacent to opposing sides and rear surface or the hitch accessory to snugly secure the hitch ball and thereby dampen movement and rattling. However, since the rubber device is installed in the hitch platform, the hitch ball may not align the rubber device in all position, particularly if used with a dual flange ball that is installed on the uppermost or lowermost portion of the platform.

Although the latter device provided an improvement over prior art hitch assemblies and reduced rocking, swaying and pivoting of the hitch assembly relative to the vehicle, issues arising from loose rattling between the tow accessory member and hitch receiver platform persists. As is readily surmised from consideration of impacts and resulting external forces exerted upon a vehicle and any towed accessory will shake and exert commensurate stress loosening abutting rigid metal surfaces of the hitch assembly and will resonate toward edges of the hitch ball base and platform, resulting in rattling and possible swaying of the vehicle.

Such vibration, noise and directional interference with safely steering the car may be exacerbated if the hitch ball or tow accessory are not tightly compressed along the channel of the platform. This is particularly problematic if the hitch ball mount tow accessory is installed on an uppermost or lowermost end of the channel where the entire length of the hitch ball mount base is not supported along the channel of the tow accessory, which is a particularly prevalent issue associated with dual flange ball. When in upper and lower mounted positions, the base may extend beyond the channel and flanges support exacerbating movement causing rattling and vibrations and may even cause veering, swaying, gyrating and even dangerous pivoting to one side or another of the vehicle that is difficult. This rattle or chatter is at best an annoyance and at worst can distract the driver or cause damage to the vehicle or tow accessory. In extreme driving terrain or weather condition, the swaying or pivoting of the vehicle may be impossible to control.

The drawbacks of unattenuated rattle or sway may be exacerbated when multi-purpose hitch mounts with more complex structures are used. In particular, triple ball hitches have socket-type balls in a variety of sizes that are typically engineered by soldering or welding fitted surfaces of the respective balls. Hence a single hitch mount can be used to hitch a corresponding socket of a trailer can be hitched to the tow vehicle. Three common sizes of balls are, for example, 1⅞, 2", or 2⁵⁄₁₆", but other sizes may be used a main hitch member adapted to be received in a hitch receiver that is attached to the tow vehicle. A pin that secures the main hitch member to the hitch receiver and transmits pulling and braking loads between the tow vehicle and the trailer. In such triple ball conventional hitches, another type of a hitch (such as a clevis or a hook hitch) may be provided on a fourth side of the main hitch member, such that another type of a trailer not having a ball hitch may be towed by the tow vehicle.

A yet further feature combined with tow mounts are hitch steps to facilitate access to spaces on or in the towing vehicle that are out of reach, such as, for example, in truck beds, rooftops or utility vehicle stowage areas. The multifunctionality imparted to so merging variously sized balls together with a step in a single hitch mount provides obvious efficacies such as convenience of having a single multi-use device saving stowage space and fewer pieces to track and find when needed. However, drawbacks associated with the bulk and density as well as piecemeal joining, typically by soldering or welding, of corresponding mated surfaces of the each of the three balls as well as the step may compromise the strength and durability of conventional triple ball mounts. Unfortunately, the impact and torque exerted by the physical load together with the vibration and pressure from the pulling and pushing on the adjoined surfaces and fastener pins of conventional triple ball tow hitch may erode and loosen the adjoined surfaces of components of conventional multiple function hitch mounts thereby compromising their strength, durability and safety.

Moreover, the bulk and density of such multifunctional tow mounts exacerbate the vibrational rattle and sway caused by friction between abutting metal surfaces of the hitch and socket and attachment hardware, such as fastener pins that secure the telescoped tow shank into the receiver of the towing vehicle. Hence, the dampening device and method described and claimed in application Ser. No. 16/518,471 of which this is a continuation in part, and is incorporated herein, is particularly efficacious when applied to conventional triple ball hitches particularly when also equipped with a step.

Yet another disadvantage attendant to conventional mounts for triple ball mounts is the lack of height adaptability. Thus, although the variously sized balls accommodate different socket sizes of tow accessories, they are not adjustable to the height of a particular trailer or other equipment being towed. Towing vehicle hitch heights, for example, between a highly suspended, four-wheel pickup truck as compared to a standard car, may vary considerably. Trailers and other towed equipment and their tow bars also vary in height. This is a particular problem if the towing vehicle hitch receiver sits relatively low to the ground and alternatively a relatively high trailer exerts a lifting action on the back end and wheels while the front is pushed downwardly. In the latter situation, the towed load pressure could cause reverberations and involuntary directional pulls that could ultimately cause the driver of the towing vehicle to lose control and even result in an accident.

Hence, there persists a need for a more durable multiple use hitch mount built to withstand the load pressure and vibrational rattle and torque and is height adjustable in order to better attenuate the play between the hitch assembly platform and base of the hitch ball member and associated noise, vibration and sway.

SUMMARY OF THE INVENTION

Addressing such and other drawbacks, the present invention relates to a hitch dampener assembly for mounting between a base of a tow accessory such as a multiple hitch ball and a hitch platform. The present hitch dampener assembly absorbs and attenuates impacts exerted from the movement of a vehicle and tow accessory, dissipates the exerted force at the tow mount base and hitch platform junction, thereby reducing associated play movement, vibration and resulting rattling and swaying.

The hitch dampener assembly of this invention reduces movement between a hitch platform and a hitch mount member deployable in various hitch platform and tow mount configurations whereby compressing the dampener member between squarely aligned planar surfaces through seated coupling within abutted flanges secures the hitch platform/tow mount member junction such that movement and association vibration, noise and sway are reduced.

In various embodiments such as described and claimed herein, the hitch platform includes a shank tube portion configured for telescoped seating within a receiver tube attached to a vehicle and an elongate member disposed on a longitudinal axis perpendicular to the shank tube member having a front surface opposite the shank tube end, and wherein the elongate member further includes a plurality of through holes orthogonally disposed to the longitudinal axis of the elongate member such that the plurality of through holes are equidistantly spaced back from the front surface of the elongate member. The various embodiments further include a tow mount member having a base member with a rear surface disposed between a pair of opposed flanges extending outwardly from the rear surface and a receiver end opposite to the rear surface, wherein the pair of opposed flanges are configured for slidable correspondence with the elongate member of the hitch platform, wherein the pair of opposed flanges have paired side holes disposed in parallel alignment for receiving a fastening member to thereby secure the tow mount member in coupled engagement with the hitch platform.

A yet further feature of various embodiments is a dampener member. In various embodiments, the dampener member may be affixed to at least a portion of the rear surface of the base member disposed between the pair of opposed flanges. The various embodiments further include a least one fastening member configured for coupling one or more of the through holes of the elongate member between paired side holes of the opposed flanges such that coupled engagement of the fastening member with the side holes securely engages the elongate member between the pair of opposed flanges so the front surface of the elongate member is aligned with the rear surface of the base member to thereby secure the dampener member upon the rear surface of the base member.

In various embodiments, at least a portion of the front surface of the elongate member or recessed column of the hitch platform and at least a portion of the rear surface of the base member are configured for coupled correspondence. Coupled correspondence of at least a portion of the front surface of the hitch platform and at least a portion of the rear surface of the base member may include a coextensively abutted area that is planar or curvilinear. In some embodiments, at least a portion of the front surface of the hitch platform and at least a portion of the rear surface of the base member are configured for coupled correspondence across a coextensively abutted area that is at least a portion of a polygon. The planar portion may be a rear surface of an elongate member with spaced through holes between planar, curvilinear or polygon-shaped side walls or a recessed area perpendicularly disposed between opposed flanges with side holes spaced in corresponding paired alignment.

In alternative embodiments, paired aligned side holes of flanges extended from side edges of a rear surface of a tow mount member base portion opposite a receiver end may be configured for coupling to corresponding through holes of an elongate member perpendicularly disposed from the shank tube member. The base portion of the tow mount member may in some embodiments include a base block with a planar rear surface and through holes configured for aligned correspondence with corresponding paired side holes of the opposed flanges of a recessed column of an elongate channel hitch platform wherethrough a fastening member couples at least one through hole of the base portion between paired corresponding side holes of the opposed flanges such that engagement of the fastening member with the side holes and the at least one through hole secures the vibration dampener member between coextensive planar surfaces of the hitch platform and the tow mount member.

The vibration dampener member according to the present invention may include an elastomer, rubber or any pliable or flexible material capable of absorbing impacts and vibrations, reducing noise and attenuating movement between abutting and adjacent surfaces of a channel platform member and rear face of a base member of tow mount member including one or more receiver ball or other tow accessory and a hitch receiver.

Further features and particular efficacies of the present invention are drawn toward a multiple hitch assembly for mounting a tow accessory or a trailer to a tow vehicle having a dampener member for reducing the vibration noise and rattle emanating from the hitch platform and the multiple hitch member, that may be exacerbated with the added mass and density of the multiple tow member and pressure of heavy trailers or loads often towed by such assemblies. Embodiments of the present invention include dampener members employed by various height adjustable hitch platforms configured for telescoped coupling within a receiver tube attached to the tow vehicle deploying an elongate member with through holes for adaptive coupling of a corresponding tow mount member column such that abutted corresponding hitch platform front planar face and tow mount member rear planar face compress dampener member while maintained in squared alignment between opposed flange extending from side walls of either of the abutted planar faces. In the various embodiments, the dampener member may be attached to either the hitch platform front planar face or the tow mount member rear planar face. Protruding from a distal end opposing the rear face of the base member is a multiple tow mount having a receiver end with radially disposed hitch balls or other tow accessory receiver mechanisms.

Embodiments of the present invention may further feature a step and a plurality of hitch mounts that are radially disposed outwardly from the pedestal, a dampener member affixed to the rear surface of the base member such that the dampener member abuts the rear panel of the channel portion to thereby dampen noise emanating from rubbing of the hitch platform and the hitch receiver; and at least one fastening member configured for coupling the through hole of the base portion between the aligned side holes such that locked engagement of the fastening member with the side holes compresses the dampener member upon the rear panel of the channel portion. In various embodiments the channel member may be configured by flanking opposed flanges along vertical sides of a planar front face on the hitch platform opposite the shank end or planar rear face of a tow mount member base member.

In preferred embodiments, the plurality of hitch mounts includes three hitch receiver balls of different dimensions. The hitch ball receivers are in such preferred embodiments standard size ball hitches of 1.25×1.25 inches (3.2×3.2 cm), 2×2 inches (5×5 cm), 2.7×2.7 inches (5.6×5.6 cm). Alternative embodiments may combine or substitute standard for irregular size hitch mounts. In addition, a pintle hook or alternative hitch means may be integrated or combined with the multiple hitch mount assembly of the present invention.

The multiple hitch assembly also includes a step member integrally formed onto the pedestal. In preferred embodiments, two of the three hitch receiver balls are disposed in opposed transverse orientations and the step member is disposed in opposed transverse orientation to another of the three hitch receiver balls. In some preferred embodiments, the step member is a planar surface of a generally rectangular configuration dimensioned to accommodate one foot or both feet of a user and om particularly preferred embodiments, an upper surface of the step member has skid resistant indentations.

In some embodiments, the fastening member coupling the through hole of the hitch member base member to the aligned side holes of the receiving channel is at least one elongate pin. In some preferred embodiments, the at least one elongate pin comprises two elongate pins. In alternative embodiments the at least one elongate pin is a U shape with a bridge joining two elongate pins. Preferred embodiments further feature a fastening member including two clevis pins configured for coupled engagement with corresponding aligned side holes and a clip or cotter pin hole and wherein the clip or cotter pin is configured to secure the clevis pin within the selected corresponding aligned side holes when coupled in locked engagement with the clip or cotter pin hole.

A yet further feature of the present invention is the dimensioning and spacing of one or more through holes of the base member such that the hitch assembly member may be detachably coupled to the channel member of the hitch platform so as to alternatively adjust the height of the multiple hitch assembly while the hitch platform is in coupled engagement with the tow vehicle. Embodiments also include dimensioning the base member such that the fastening member is capable of detachably coupling the through holes so as to detachably couple the multiple tow hitch member to selectively orient a one of the hitch balls and step in an upward use position while the hitch platform is in coupled engagement with the tow vehicle.

The present invention further provides a method for providing a multiple hitch assembly for mounting a trailer to a tow vehicle, comprising the steps of: a channel member having a recessed column disposed between opposed flanges, wherein the shank tube member is integrally connected to a rear surface of the recessed column such that the channel member is disposed along a substantially perpendicular axis along an opposing end to the elongate end portion of the shank tube. A plurality of spaced pairs of aligned side holes are disposed in the opposed flanges. Also provided is a multiple hitch member having a hitch receiver end having ball mounts radially extended in different directions from a base portion with aligned pairs of through holes spaced and sized for coupled engagement with the plurality of corresponding aligned side holes. As fastening member detachably couples the corresponding through holes of the multiple hitch member and the hitch platform so as to alternatively secure the hitch balls to a use orientation at a selected height.

As further described and illustrated herein, a particularly preferred embodiment includes a rubber vibration dampener member detachably affixed onto the back surface of a base portion of a dual flange ball mount tow mount or accessory. By thus affixing the dampener member to the multiple tow hitch member, coupling the fastening member through the corresponding through holes of the multiple hitch member and the aligned side holes of the channel member of the hitch platform secures the dampener member firmly against the hitch platform and is deployed in all positions regardless height adjustments thereto. A representative embodiment of this vibration dampener device particularly suitable for after-market applications includes a combination of rubber and metal screw thread configured to engage a corresponding threaded hole the back surface of the tow hitch member base.

As used herein, "tow mount member" refers to a range of single, dual, triple or quadruple hitch balls, hooks, clasps and may include other tow hitch mechanisms such as, for example pintle hooks, cotter pins or other hitch mount member for securing an adjustably mounted receiver mechanism on a channel mount platform adaptable to various tow accessories including a trailer or carrier such as a bicycle or recreational equipment racks, ski carriers, storage decks, boxes, cages or bags and other types of carriers and has a height adjustable hitch platform capable of being adapted to the height of a particular tow accessory while coupled within a receiver tube attached to a vehicle.

These and other features will be evident from the ensuing detailed descriptions of representative exemplary embodiment below and from the drawings.

DETAILED DESCRIPTION OF VARIOUS EMBODIMENTS

Figure 1:
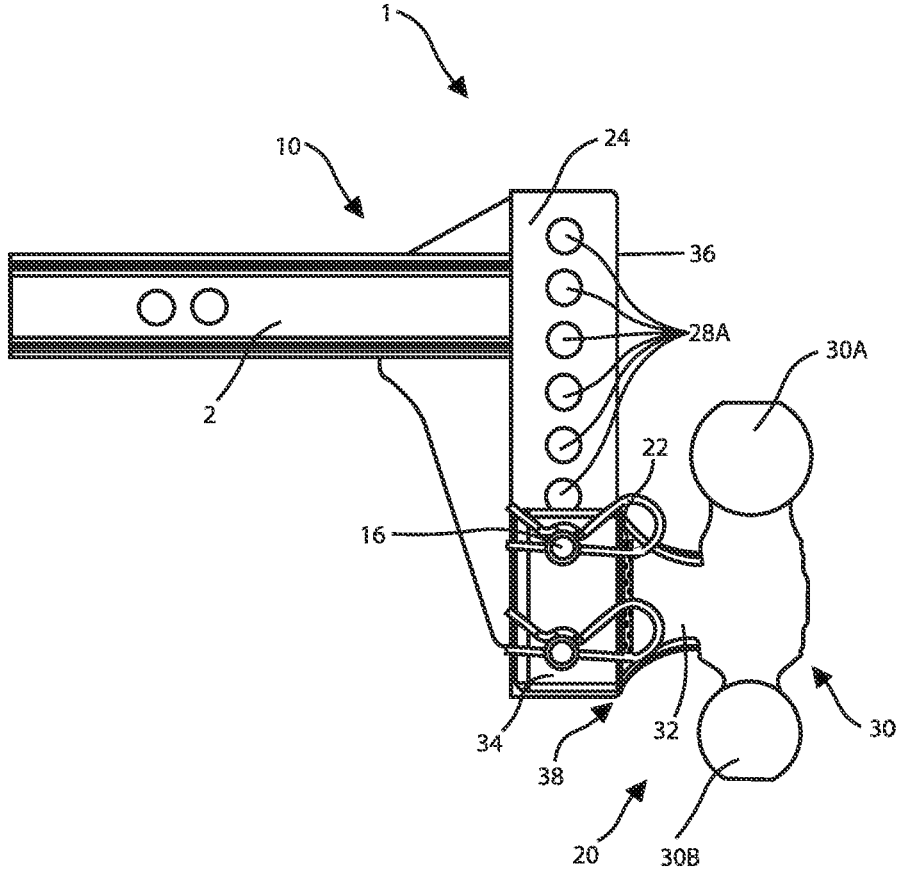
FIG. 1 is a side view of an exemplary multiple tow mount assembly of the present invention depicting the concealed dampener member in dashed lines.

It is to be expressly understood that the illustrative embodiment is a representation of the invention for explanatory purposes only and is not meant to unduly limit the claimed invention. The representative embodiments of the present invention are intended for use with receiver hitch systems including trailer mounts but also includes other dual or triple hitch mount configurations with or without a step hitch member such as detailed below. As will be apparent in a review of FIGS. 1-6, indistinct variants or species of tow mount assembly illustrated herein are tagged by suffixed hash marks, ' or ", denoting congruent features of the various embodiments. The illustrated as well as alternative embodiments may be used for original equipment installations and as an after-market accessory.

As illustrated and described in detail below, exemplary embodiments of the present invention illustrated in FIGS. 1-6 depict a hitch assembly 1, 50" including tow mount member 20, 40 wherein vibration and noise emitted between shank hitch platform 10, 10' or 30, and tow mount member 20, 40 exemplifying embodiments wherein dampener member 22, 22', and 32 may be affixed to rear surface 38, 38' of recessed column 8 or base block 24.

In exemplary embodiments shown in FIGS. 1-6, a shank tube of hitch platform 10 or 30 is attachable within a corresponding receiver tube mounted beneath a bumper of a vehicle by well-known mounting techniques, such as by bolting or welding (not shown). In the illustrated embodiment, shank tube 2 is sized and configured for telescoped seating within a 1½ inch square or 2-inch square receiver tube (internal dimensions). As is readily apparent, the hitch dampener assembly of the present invention may be employed with other sizes of shapes of hitch receiver tubes and other vehicle attachment mechanisms.

In the exemplary embodiments described herein, tow mount member 20 is illustrated as a dual hitch ball and tow mount member 40 depicts a tri-ball mount with a step member 6. However, the scope of the claimed invention extends to other mount assemblies including but not limited to tow mount members featuring single or multiple hitch balls, hooks, step mounts and include pintle hooks or any tow accessory mount for cargo, bicycles, motorcycles, wheelchairs, or carriers, such as, for example, cargo containers, platforms and other types of receiver mounted devices.

In embodiments such as illustrated in FIGS. 1-4, tow mount assembly 1, 1', 1" includes a shank hitch platform 10, 10', 10" including a shank tube end 2, 2' configured for telescoped coupled engagement within a receiver tube attached to a tow vehicle (not shown). Hitch platform 10 includes elongate member 24 disposed on a longitudinal axis perpendicular to the shank tube end 2. Opposite and perpendicularly disposed to shank tube end 20 is elongate member 24, 24', 24" wherein spaced through holes 28A, 28A' are disposed and having a front surface 38, 38', 38" that may be variously configured. Exemplary embodiments are respectively illustrated as a parallelogram-shaped block base 24 such as shown in in FIG. 2, curvilinear block base 24' such as shown in tow mount assembly 1' of FIG. 2B and polygonal block base 24" such as shown in tow hitch assembly 1" of FIG. 2C.

Figure 2:
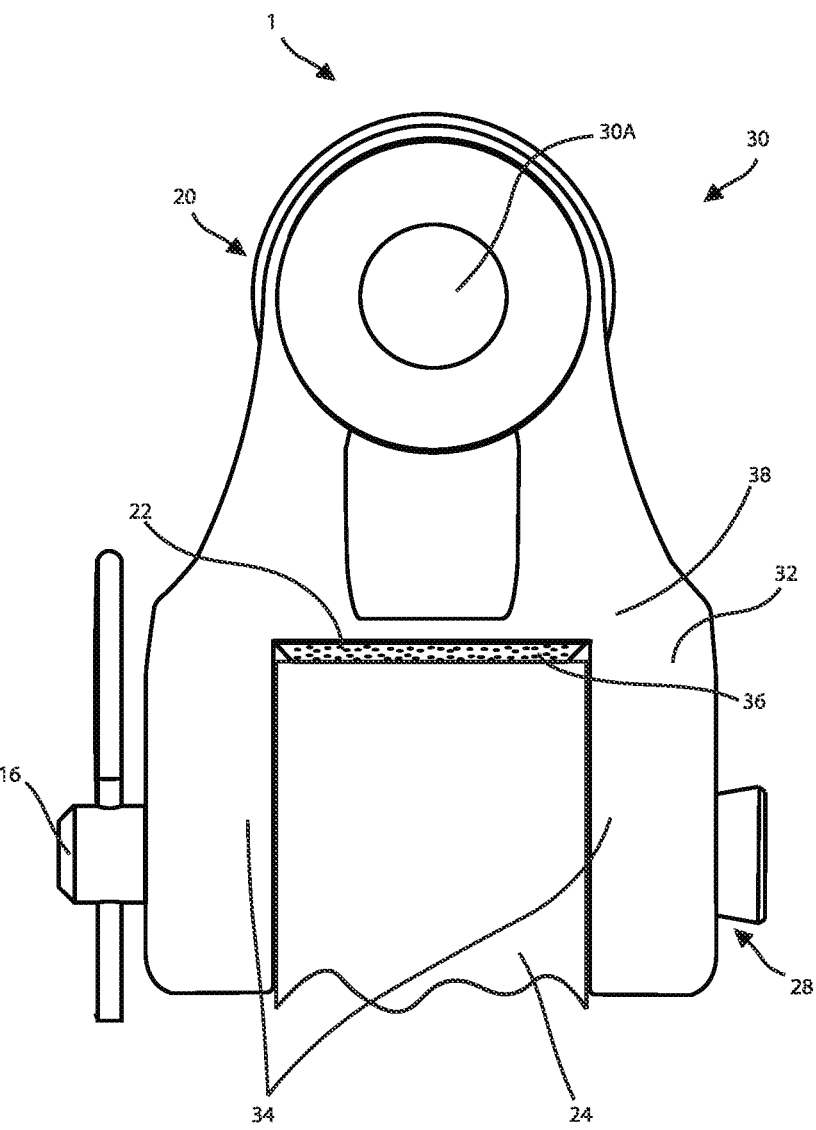
FIG. 2 is a top view of the embodiment of the multiple tow mount assembly illustrated in FIG. 1.
Figure 2B:
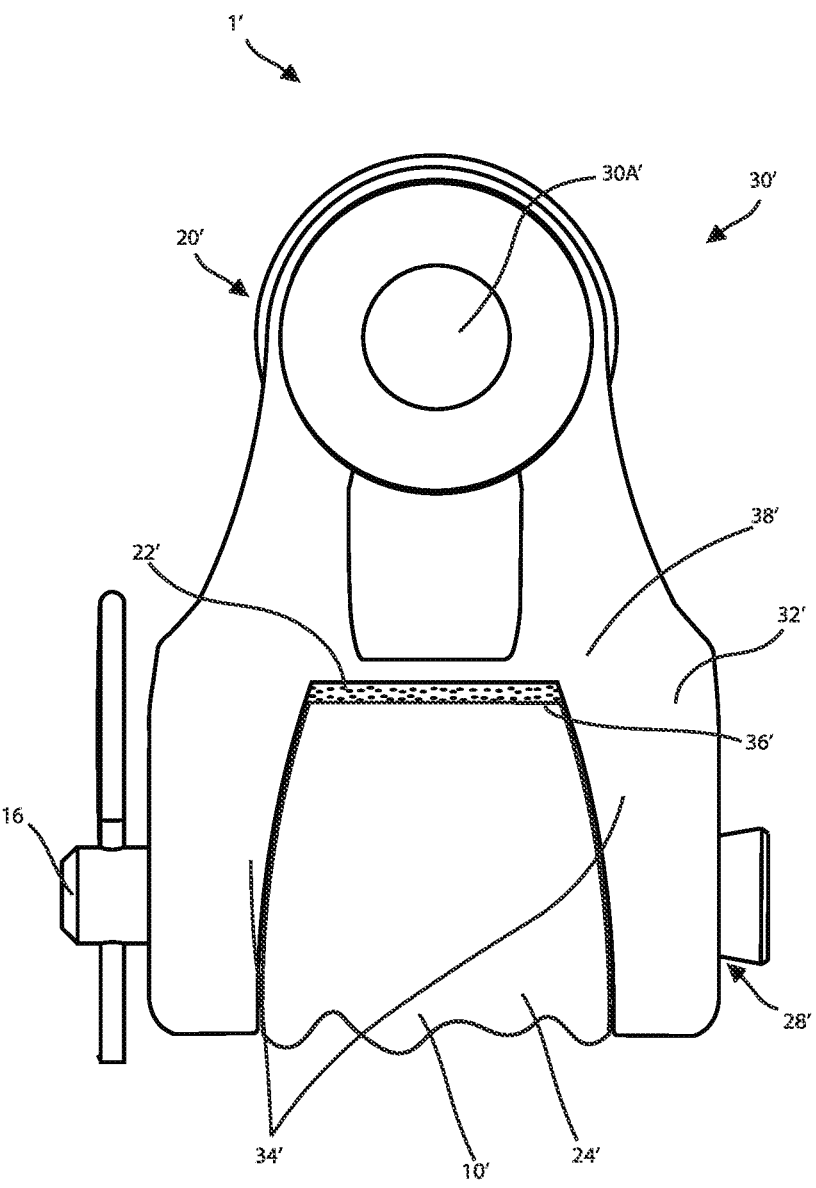
FIG. 2B is a top view of a second embodiment of the multiple tow mount assembly.
Figure 2C:
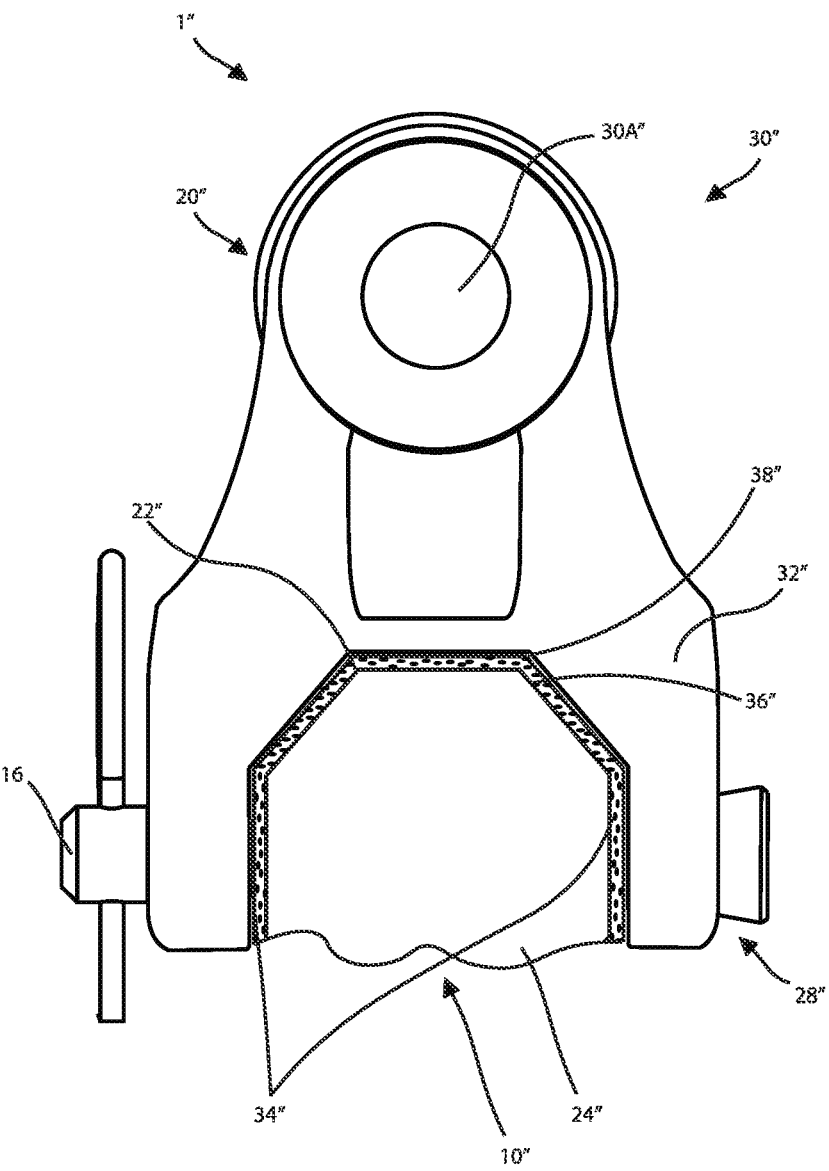
FIG. 2C is a top view of a fourth embodiment of the multiple tow mount assembly.

Hence it can be readily seen that front surface 36, 36', 36" has opposed sides that can be variably configured, as respectively illustrated as a parallelogram-shaped such as shown in FIG. 2, curvilinear such as shown in FIG. 2B or polygonal such as shown in FIG. 2C. Disposed in parallel alignment with the rear surface 36, 36', 36" are a plurality of spaced apart and aligned paired holes 28A disposed in opposed flanges 34. Paired holes 28A are configured to correspond with through holes 28B sides of elongate member 24. It can thus be seen that at least a portion of the front surface of hitch platform 10, 10', 10" and at least a portion of the rear surface of the base member 24, 24', 24" are configured for coupled correspondence when fastening member 16 is respectively inserted within aligned through holes 28.

In some embodiments, such as illustrated in FIGS. 2A and 2B, by dampener 22, 22' may abut front surface 36, 36' only of tow mount member 20, 20'. In other various embodiments, such as illustrated in FIG. 2C, dampener 22" between corresponding surfaces of tow mount member 20" can extend about the sides of the interior walls of the hitch platform 10" so as to abut the coextensively abutting walls of base member 24".

Still referring to FIGS. 1-4, tow mount assembly 1, 1', 1" further includes receiver tow mount member 20, 20', 20" having a respective base member 32, 32', 32" and rear surface 38, 38', 38" disposed between a pair of opposed flanges 34, 34', 34" extending outwardly from the rear surface 38, 38', 38" and a front receiver end 30, 30', 30" opposite respective rear surface 38, 38' 38". Extending rearwardly from the planar rear face 38 are opposed flanges 34 configured for slidable correspondence with the side walls of elongate member 24, 24', 24" of hitch platform 10, 10' 10", wherein the pair of opposed flanges 34, 34', 34" have paired side holes 36, 36', 36" disposed in parallel alignment, wherein fastening member 16 is received by a pair of corresponding through holes 28A, 28A' of elongate member 24, 24', 24" and aligned paired side holes 28B.

Figure 5:
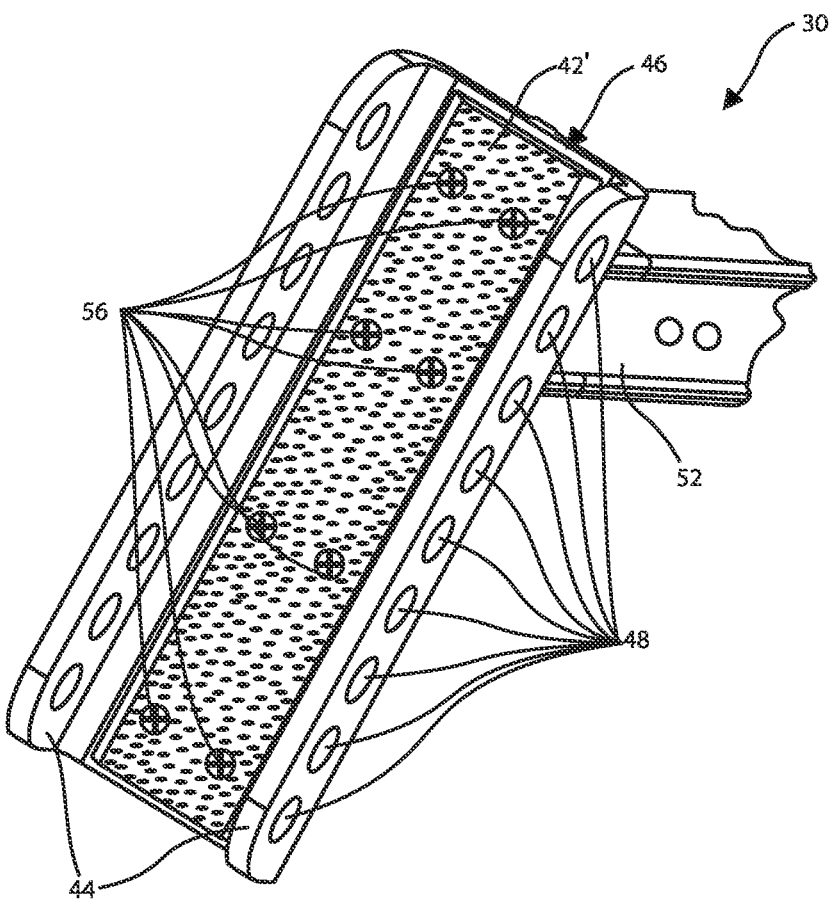
FIG. 5 is a side view a third exemplary embodiment of the shank hitch platform of the multiple tow mount assembly.
Figure 6:
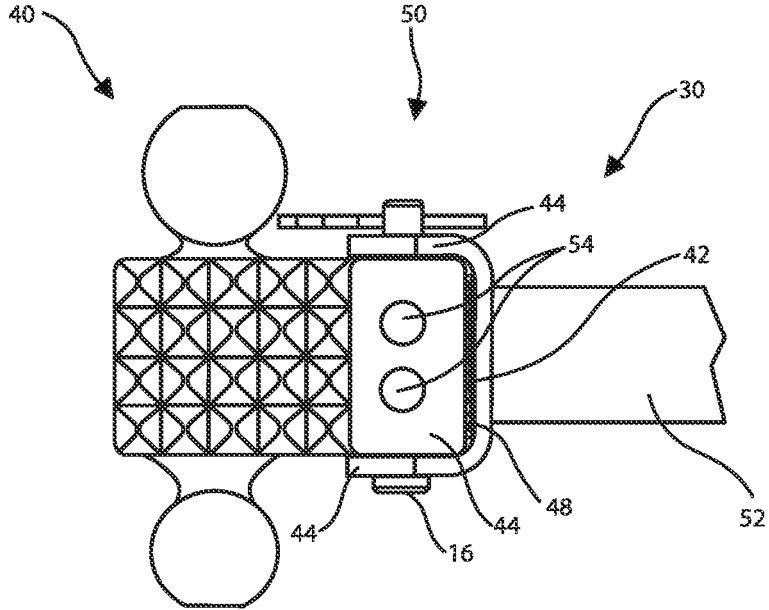
FIG. 6 is a top view of the third exemplary embodiment of the multiple tow mount member shown in FIG. 5.

As best illustrated in FIGS. 5 and 6, dampener member 22 and 22' may be affixed to either tow mount member 20, 20', 20" or hitch platform 10, 10', 10". FIG. 5 illustrates various embodiments wherein dampener member 22, 22', 22" is affixed to at least a portion of surface 36, 36', 36" of tow mount member 20, 20' 20" base member 32, 32', 32" such that coupling of fastening member 16 within aligned paired side holes 28B and through holes 28, 28', 28" compresses corresponding dampener member 22, 22', 22" between front surface 36, 36', 36" of elongate member 24, 24', 24" of hitch platform 10, 10', 10" and rear surface 38, 38', 38" of tow mount member 20, 20', 20".

Coupling of fastening member 16 with aligned side holes 28B and through holes 28A such that respective surface 36, 36', 36" of elongate member 24, 24', 24" and 38, 38', 38" of tow mount member 20, 20', 20" is in seated alignment whereby dampener member 22, 22', 22" is compressed between corresponding coextensive front surface 36, 36', 36" of elongate member 24, 24', 24" and rear surface 38, 38', 38 of base member 32, 32' 32". Such compression of dampener member 22, 22', 22" thereby reduces vibration and associated vibration and sway resulting from movement and metal-to-metal contact between abutting surfaces of tow mount member 20, 20' 20" and hitch platform 10, 10', 10".

The illustrated embodiments illustrate an exemplary fastening member 16 as two elongate clevis pins configured for coupled engagement with corresponding aligned side holes and having a cotter pin hole and wherein is configured to secure the cotter pin within the selected corresponding aligned side holes when coupled in locked engagement with the cotter pin hole. However, the fastening member may in various embodiments comprise various other clips and retaining mechanisms configured to couple the paired side holes 36, 36' with a corresponding through hole 36 of elongate member 24, wherein the tow mount members are a two hitch balls of different diameters.

Now referring to FIGS. 5 and 6, other exemplary embodiments include tow mount assembly 50 with a shank tube end 52 configured for telescoped coupled engagement within a receiver tube attached to the vehicle and an elongate member disposed on a longitudinal axis perpendicular to the shank tube member having a front surface opposite the shank tube end. The channel hitch platform 30 includes paired aligned side holes 48 in flanges 44 for coupling a tow mount member 40 having dual or triple hitch balls and a step member extending from a base member 34 sized and configured for slidably fitted correspondence within the recessed column 38. As illustrated in FIG. 5, dampener 32 may be affixed to rear surface 38 of shank hitch platform 30 by a plurality of screws 48.

Referring to FIG. 6, various embodiments illustrated as tow mount assembly 50 may feature tow mount member 40 having two pairs of through holes 54 disposed between two transverse pairs of opposed side walls of intermediate to base member 44 and channel hitch platform 30. In the illustrated embodiment, tow mount assembly 50 is adaptably rotatable to position the desired receiving hitch ball or step

6 in an upward use position such that paired side holes 48 and a corresponding pair of through holes 54 are positioned to thereby enable coupling with fastening member 16 including two elongate pins received through aligned side holes 48 and through holes 54 so as to seat base member 34 in coupled aligned engagement within flanges 44 and recessed column 38 of hitch platform 30 such that the dampener member 42 is secured between rear face 48 of tow mount member 40 and hitch platform 30 so as to dampen vibration associated with the strain, noise and sway emitted by a trailer or other tow accessory.

While the exemplary embodiments illustrated in FIGS. 1-6 depict dampener member 22, 22', 22", 42, 42' in exemplary configurations, alternative configurations of dampener member may vary in accordance with the use and dimensions of the respective platform, tow accessory and tow vehicle in connection with which it is being deployed.

Configurations of dampener member 22, 22', 22", 42, 42' in various embodiments can take on various configurations which may include linear, curvilinear, convex or concave portions. In some embodiments, dampener member 22, 22', 22", 42, 42' may include a dampener border of at least a portion of an area within 1 inch of an upper edge, at least a portion within 1 inch of a lower edge and at least a portion within 1 inch of the side edges of a planar front face of an elongate member platform or a corner an abutment of the interior side wall of the pair of flanges. Some embodiments of the dampener member may feature a hollow center portion.

Figure 3:
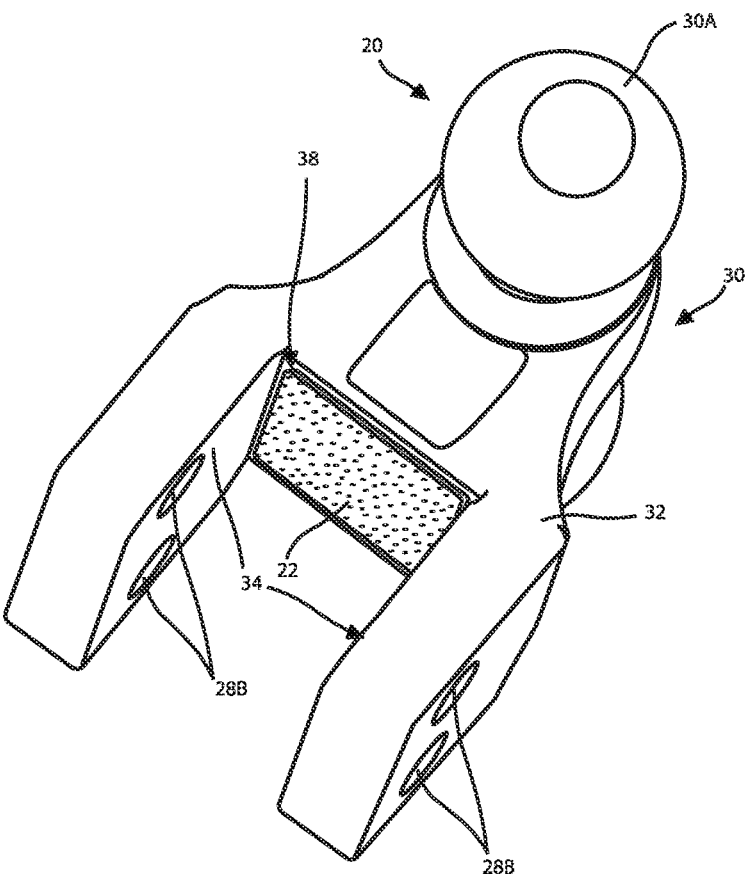
FIG. 3 is a perspective view of the embodiment of the multiple tow mount assembly illustrated in FIG. 1.
Figure 4:
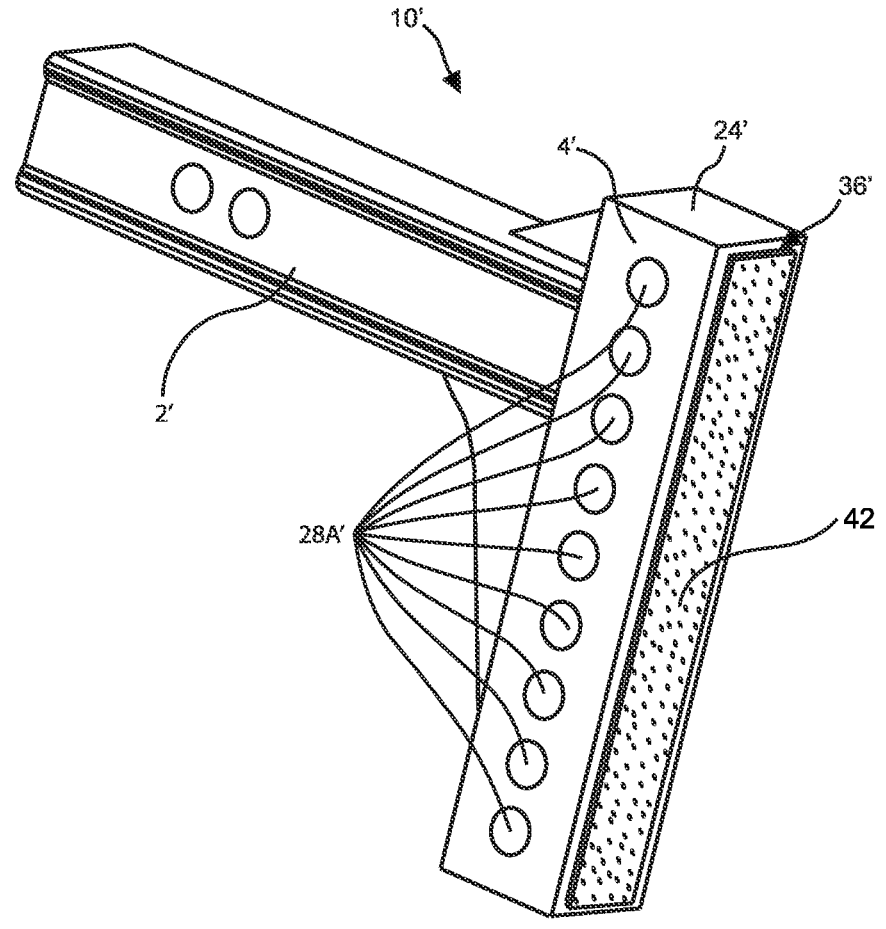
FIG. 4 is a side perspective view of an second exemplary embodiment of the multiple tow mount assembly.

In various embodiments such as illustrated in FIG. 3, dampener member 22 is provided as an adhered layer applied to rear face 38 of tow mount member 20. In various embodiments, dampener member is affixed to at least a portion of the planar rear face of the base member includes a dampener border of the rear planar member, wherein the dampener border includes at least a portion of an area within 1 inch of an upper edge, at least a portion within 1 inch of a lower edge and at least a portion within 1 inch of an abutment of the interior side wall of the pair of flanges.

In some embodiments, the dampener member is detachably affixed. As such, dampener member 22, 22', 22", 42, 42' may be provided in a kit form or as an after-market component.

The composition of the dampener member 22, 22', 22", 42, 42' may include various suitable materials, such as, for example, a polymer, elastomer, rubber or other pliable, impact or vibration-absorbing material of suitable density, flex, and durability and is functionally adaptable to dampen, buffer, dissipate or attenuate, a vibration, impact, shock, stress, strain or torque exerted by an external force. The impact absorbing or dampening composition of dampener member 22, 22', 22", 42, 42' is configurable in any suitable size and shape such as, for example, a curved or circular device, bumper, washer, block, sheet, sleeve or other form that is adaptable to the geometry of the tow hitch platform and mount member.

In some embodiments, dampener member 22, 22', 22", 42, 42' such as shown in FIGS. 1-6 may be affixed by a single metal screw or multiple screws. Alternative embodiments may affix a dampener member by fusing, adhering of embedding the material to a front surface such as 36, 36', 36", 46 of elongate member 24, 24' or recessed column front surface 46 of hitch platform 30. Commercially available industrial strength epoxies, lasers, milling procedures or other means or materials well known in the art may be employed to thus affix dampener member 22, 22', 22", 42, 42' and corresponding abutting surfaces.

The scope of the present invention expressly contemplates and includes any shape as well as composition providing the impact and vibration absorbing or attenuation, the extent of which may correspond to the hitch dampener member composition's mechanical properties, including without limitation, vibration and impact absorption capacity, pliability, tensile strength and density.

As will be apparent to persons of ordinary skill in the art of tow hitch assembly design and engineering, the impact receiving and attenuation capacity of the present invention correlates to the vibration dampener member 22, 22', 22", 42,42' surface area, thickness and density and corresponding connection tension of the hitch vibration dampening assembly which is a function of the weight, shape and size, aerodynamics as well as force and torque exerted on the tow hitch assembly when in use.

Various embodiments of the present invention may include a range of tow mount members with accessory mount receivers, including variously sized hitch balls, pintle and other hooks, clips and carabiners and other mechanisms for mounting a tow accessory. Embodiments may also include mechanisms for locking tow mount and channel members in secured engagement such as provided by hooks, biasing members, bolts, clevis and cotter pins, U-shaped pins. and similar mechanisms. In yet further embodiments, the channel member may further include horizontal cross members perpendicularly disposed between opposed flanges and spaced between the aligned side holes whereby the horizontal cross members provide lateral support for the base portion of the tow mount member.

It is to be expressly understood that the descriptive embodiment is provided herein for explanatory purposes only and is not meant to unduly limit the claimed inventions. Various embodiments are intended for use with receiver hitch systems including trailer mounts as well as other tow accessories and may be used for original equipment installations or as after-market components.

Hence, it is to be further expressly understood that these exemplary embodiments are provided for descriptive purposes only and not meant to unduly limit the scope of the claimed inventions. Other embodiments are also considered to be within the scope of the present inventions.

The invention claimed is:

1. A tow mount assembly for hitching a tow accessory to a vehicle, comprising:
   a hitch platform having a shank tube member configured for telescoped coupled engagement within a receiver tube attached to the vehicle, an elongate member disposed on a longitudinal axis perpendicular to the shank tube member having a front surface opposite a shank tube end, wherein the elongate member includes a plurality of through holes orthogonally disposed to the longitudinal axis of the elongate member such that the plurality of through holes are equidistantly spaced back from the front surface of the elongate member;
   a tow mount member having a base portion with a rear surface disposed between a pair of opposed flanges extending outwardly from the rear surface and a receiver end opposite to the rear surface, wherein the pair of opposed flanges are configured for slidable correspondence with the elongate member of the hitch platform, wherein the pair of opposed flanges have one or more paired side holes disposed in aligned parallel correspondence with the plurality of through holes of the elongate member;
   a dampener member affixed to at least a portion of the rear surface of the base portion disposed between the pair of opposed flanges or at least a portion of the front surface of the elongate member; and
   at least one fastening member configured for coupling at least one of the plurality of through holes of the elongate member between the paired side holes of the opposed flanges such that seated engagement of the at least one fastening member with the side holes securely couples the elongate member between the pair of opposed flanges such that the front surface of the elongate member is securely aligned with the rear surface of the base portion so as to press the dampener member upon the rear surface of the base portion.

2. The tow mount assembly of claim 1, wherein the at least one fastening member is a biasing member, a bolt, a clevis, a cotter pin or a U-shaped pin configured for coupling a pair of the through holes between a corresponding pair of adjacent paired side holes.

3. The tow mount assembly of claim 1, wherein at least a portion of the front surface of the elongate member and at least a portion of the rear surface of the base portion are configured for coupled correspondence in a coextensive area that includes at least a portion of a planar interface or a curvilinear interface.

4. The tow mount assembly of claim 1, wherein the dampener member is affixed by a screw, a bolt, an adhesive, a fusion agent or a coating process.

5. The tow mount assembly of claim 1, wherein the dampener member is affixed to at least a portion of the rear surface of the base portion, and wherein at least a corresponding portion of the dampener member is disposed within 1 inch of an upper edge of the rear surface, at least a corresponding portion of the dampener member within 1 inch of a lower edge of the rear surface or at least a corresponding portion of the dampener member within 1 inch from the pair of opposed flanges.

6. The tow mount assembly of claim 1, wherein at least a portion of the dampener member includes a hollow region or a concavity.

7. The tow mount assembly of claim 1, wherein the dampener member is detachably affixed to an intermediary portion mated to the rear surface of the base portion disposed between the pair of opposed flanges.

8. The tow mount assembly of claim 1, wherein the receiver end includes a radially disposed dual hitch ball comprising a first hitch ball and a second hitch ball of a different diameter than the first hitch ball.

9. The tow mount assembly of claim 1, wherein the receiver end includes a pintle hook.

10. A tow mount assembly for hitching a tow accessory to a vehicle, comprising:
   a hitch platform having a shank tube member having an elongate end portion configured for telescoped coupled engagement within a receiver tube attached to the tow vehicle, a channel member having a recessed column disposed between opposed flanges, wherein the shank tube member is affixed to a back surface of the recessed column such that the channel member is longitudinally disposed along a substantially perpendicular axis opposite to the elongate end portion of the shank tube, and wherein a plurality of spaced pairs of aligned side holes are disposed in the opposed flanges;
   a tow mount member having a base portion configured for slidable correspondence with the channel member, wherein the base portion has a planar rear surface between a pair of opposed side walls, and wherein at least one through hole is disposed in parallel alignment with the planar rear surface, and wherein a receiver end opposite to the planar rear surface includes at least three tow accessory mounts radially disposed in different directions from the base portion;

a dampener member affixed to at least a portion of the recessed column of the channel member or the planar rear surface of the base-portion; and at least one fastening member configured for coupling the at least one through hole of the base portion between the paired side holes of the channel member such that securing the base portion in abutted alignment with the recessed channel of the hitch platform compresses the dampener member against the channel member.

11. The tow mount assembly of claim 10, wherein the at least three tow accessory mounts include at least two hitch balls, wherein the at least two hitch balls are different diameters.

12. The tow mount assembly of claim 10, wherein the at least three tow accessory mounts comprises a step member, a tow hook or a pintle hook.

13. The tow mount assembly of claim 10, wherein the channel member further comprises horizontal cross members perpendicularly disposed between the opposed flanges and spaced between the aligned side holes, wherein the horizontal cross members provide lateral support for the base member of the tow mount member.

14. The tow mount assembly of claim 11, wherein the at least three tow accessory mounts comprise three hitch balls, wherein each of the three hitch balls are different diameters.

15. The tow mount assembly of claim 14, further comprising a step member or a pintle hook.

16. The tow mount assembly of claim 10, wherein the at least one fastening member is a bolt, a clevis pin, a cotter pin or a U-shaped pin.

17. The tow mount assembly of claim 10, wherein at least a portion of the dampener member includes a hollow or a concavity.

18. The tow mount assembly of claim 10, wherein the dampener member is affixed to the recessed column by an intermediary flanged member, a screw, a bolt, an adhesive, a fusion agent or a coating process.

19. The tow mount assembly of claim 17, wherein at least a portion of the dampener member is affixed to at least a corresponding portion-of the rear surface of the tow mount member, within 1 inch of an upper edge of the rear surface, at least a corresponding portion within 1 inch of a lower edge of the rear surface or at least a corresponding portion of the rear surface within 1 inch of the opposed side walls of the tow mount member.

20. A tow mount assembly for hitching a tow accessory to a vehicle, comprising:

a hitch platform having a shank tube member having an elongate end portion configured for telescoped coupled engagement within a receiver tube attached to the tow vehicle, a channel member having a recessed column disposed between opposed flanges, wherein the shank tube member is affixed to a back surface of the recessed column such that the channel member is longitudinally disposed along a substantially perpendicular axis opposite to the elongate end portion of the shank tube, and wherein a plurality of spaced pairs of aligned side holes are disposed in the opposed flanges;

a tow mount member having a base portion opposite a distal receiver end, wherein the base portion includes a rear member having opposed flanges perpendicularly disposed between a recessed rear face, wherein the opposed flanges are configured for slidable correspondence within the channel member, and wherein the opposed flanges of the rear member have a plurality of spaced pairs of aligned through holes configured for aligned correspondence with the plurality of spaced pairs of aligned side holes of the flanges of the channel member;

a dampener member affixed to the recessed rear face; and at least one fastening member configured for coupling at least one of the spaced pairs of aligned side holes of the flanges of the channel member and a corresponding one of the spaced pairs of through holes of the base portion such that coupled engagement of the fastening member with the aligned side holes of the channel member and a corresponding one of the spaced pairs of through holes in the rear member of the base portion presses the dampener member against the channel member.

21. The tow mount assembly of claim 20 wherein the receiver end opposite to the planar rear surface includes a first hitch ball and a second hitch ball that are radially disposed in opposed directions, wherein the first hitch ball is a different diameter than the second hitch ball.

22. The tow mount assembly of claim 20, wherein the dampener member is a bumper having cylindrical sides.

23. The tow mount assembly of claim 20, wherein the dampener member is composed of a vibration dissipating material including one or more members of the group consisting of a rubber, a polymer or an elastomer.

* * * * *